United States Patent [19]
Morales

[11] Patent Number: 5,971,820
[45] Date of Patent: Oct. 26, 1999

[54] PARALLEL FLUID FLOW WIND AND WATER MILLS

[76] Inventor: Juan Alberto Morales, P.O. Box 8395, Panama (7), Panama

[21] Appl. No.: 08/581,870

[22] Filed: Jan. 2, 1996

[30] Foreign Application Priority Data

Aug. 18, 1995 [PA] Panama ..................................... 076883

[51] Int. Cl.⁶ ....................................................... B63H 9/00
[52] U.S. Cl. ............................................................. 440/8
[58] Field of Search .................. 244/30; 440/8, 440/6, 3, 13, 14, 15, 94, 113; 114/102

[56] References Cited

U.S. PATENT DOCUMENTS

| | | | |
|---|---|---|---|
| 3,212,470 | 10/1965 | Wiggin | 440/8 |
| 4,149,092 | 4/1979 | Cros | 440/8 |
| 4,166,596 | 9/1979 | Mouton et al. | 244/30 |
| 4,419,587 | 12/1983 | Benton | 440/8 |
| 5,383,627 | 1/1995 | Bundo | 244/30 |

FOREIGN PATENT DOCUMENTS

| | | | |
|---|---|---|---|
| 630487 | 12/1961 | Italy | 440/8 |
| 640605 | 1/1984 | Switzerland | 440/8 |

*Primary Examiner*—Stephen Avila
*Attorney, Agent, or Firm*—Robert K. Rhea

[57] ABSTRACT

A parallel fluid flow wind or water mill having one or more pair of vanes fixed around a central mass. The vanes showing in cross section a non-aerodynamic face having a plane or concave surface, and a aerodynamic back side are constructed to rotate in a plane parallel to the flow of the fluid in which they operate.

1 Claim, 3 Drawing Sheets

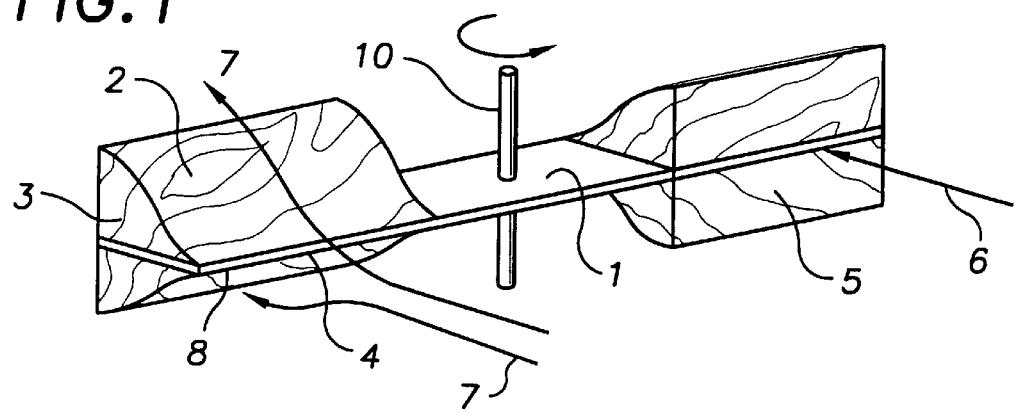
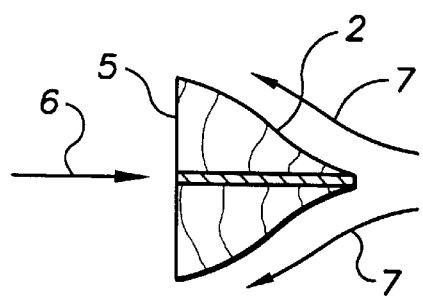
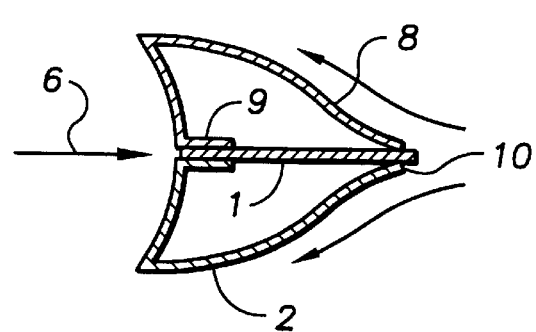
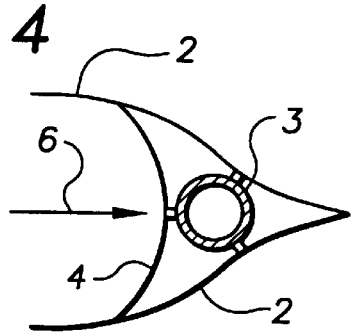
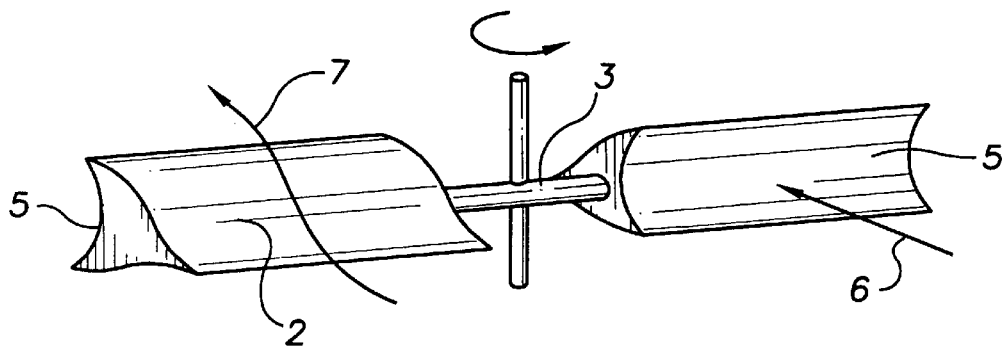

PARALLEL FLUID FLOW WIND AND WATER MILLS

BACKGROUND OF THE INVENTION

I. Reference to Existing Wind Mills

All windmills known at present have been designed under the principles of the propeller theory, according to which one can only utilize a small part of the horizontal vector of the force of the wind, that is, its very small perpendicular component. This component has to raise the weights of the vanes and make them turn around with a force capable of producing energy. Therefore, the efficiency of these kinds of mills is very poor. They can only work best when the pressure of the wind is very strong, with the result of a KW with a very high cost. Besides, there are strong winds only in a few places, and for this reason, the use of these kinds of mills is actually limited to certain areas, such as California, Holland and Tarifa (Spain). In the rest of the World, windmills practically do not exist. In short, the propeller design is a far from perfect system.

II. Reference to Existing Water Mills

Concerning water mills, the experience is even more discouraging. There is only one type of mill, invented by Leonardo da Vince 3 centuries ago, and eventually used in poor rural installations.

SUMMARY OF THE INVENTION

III. Our Parallel Fluid Flow Wind and Water Mills of Fixed Vanes

Our mills are based on very different principles from existing mills. All vanes, no matter how many, are placed around a central mass set on a vertical axle of rotation, so that the rotor of our vanes turn on a horizontal plane, instead of the vertical plane of rotation of existing mills. In other words, the object of our invention is for the vanes of the mill to move in the same plane as the fluid, as used herein fluid shall mean either wind or water unless specifically stated otherwise. Besides the vanes have an original profile, very much different from the propeller type vanes. They work by pairs opposite with respect to the central axle, and since all vanes are of the same weight, they are always in gravitational equilibrium with respect to the axle of rotation. For this reason the slightest horizontal impulse at one side of the rotor will easily make the mill turn. Hence, to obtain some mechanical energy from this fact, we only have to apply the following principle: the mill would receive the strongest possible impulse on the vanes of one side of the rotor, and the slightest one on the opposite side of it. To attain this purpose, all the vanes of all pairs of the rotor would have the same cross section, the same dimensions and weight, and in every pair the vanes must always occupy a reverse position with respect to the axle of rotation. The profile of their cross section will show on one side a vertical or concave surface, i.e. the non-aerodynamic surface, while the back side will offer a profile similar to the edge of a big axe, with two parallel horizontal sides of aero-dynamic shape. If the faces of such vanes are placed in the reverse position in all pairs, then when we see in front of us the plane or concave face (the non-aerodynamic face) of one of the vanes, at the other side of the axle the opposite vane would show the edge. In other words, the fluid flow would push on the flat or concave surface (the non-aerodynamic surface), but would slide along the two sides of the edge. Hence, in no matter what direction the fluid flows, the vanes would always turn in the same direction. The imbalance of forces with respect to the axle of rotation is the useful energy to be transformed into mechanical or electrical energy. One can now appreciate that our invention differs substantially from existing mills as follows: 1) Our mills rotate on a horizontal plane, into which moves the fluid (air or water) while the classical mills move on a plane perpendicular to the fluid flow. 2) The mills described in our invention work under the principle of the utilization of the imbalance of forces of wind or water at both sides of the rotor, without the intervention of gravity. The classical mills work by the vertical component of the horizontal force of the fluid, but not by the imbalance of forces, and are substantially affected by gravity. 3) Due of the no presence of gravity in our mills, there are no limits in size, weight or potency of our mills. they can be very small, or giants of the size of skyscrapers. The old common mills have many limitations caused by gravity, which is not the case of our mills. 4) Another important point is this: existing wind mills require a relatively strong wind to work, while ours can produce energy with just a little breeze, since we have no limits for the sizes of the mills. 5) No matter in which direction the fluid flows, the mills of this invention will always rotate in the same direction, without the need of tails or any directional apparatus.

The importance of the five principles described is made clear when we consider that in the case of river currents, or sea waves, the tides and sub-aquatic currents, no matter in which direction the water moves and whether or not it changes periodically, the mill will always move around the axle in the same direction, independent of the intensity of the current. Therefore, we call attention to the fact that the above mentioned principles have not even been considered before in any part of the world, prior to this invention.

Let us now enter into the descriptions of the drawings concerning these types of mills with fixed vanes.

BRIEF DESCRIPTION OF THE DRAWINGS

FIG. 1 is a perspective view of a mill constructed in accordance with this invention.

FIG. 2 is a cross sectional view of one of the vanes of FIG. 1.

FIG. 3 is a cross sectional view of another embodiment of the vane of FIG. 2.

FIG. 4 is another cross sectional view of another embodiment of the vane of FIG. 2.

FIG. 5 is a perspective view of another embodiment of a mill constructed in accordance with this invention.

DESCRIPTION OF THE PREFERRED EMBODIMENTS

Figure 6:
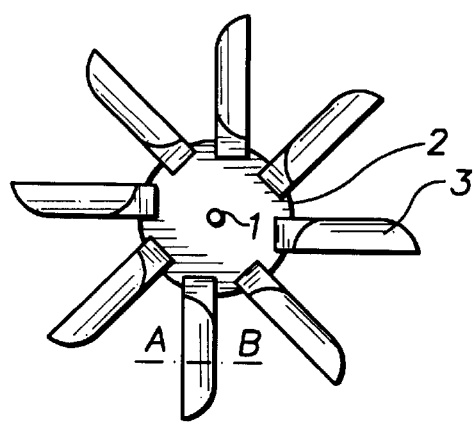
FIG. 6 is a top plan view of a disk having vanes attached thereto in accordance with this invention.

FIG. 1. Shows a pair of vanes with a central support constituted of a metal plate 10, on to which are fixed some pieces of hard wood or plastic in the shape of wedges, to create the cross section shown in FIG. 2. The pair of the two vanes opposite the axle 12 have the same section of FIG. 2, but with inverted positions. In FIG. 1, 14 is one vane of the pair, which presents its perpendicular face to the direction of the fluid (wind or water), 16; the other vane 28 of the pair, which presents towards the direction of the fluid an edge 20 similar to the edge of an axe. When the fluid flow has the direction 16, it pushes on the surface 14, while it slides (as shown by arrows 22) by the two lateral aerodynamic surfaces 24 & 26 of the vane 18, cutting the fluid without offering any significant resistance. The imbalance of the pressures on the two vanes of the pair, makes it rotate on the axle 12 in the direction shown by arrow 28. Of course the number of pairs to produce a rotor could be any, and likewise, one can make use of several rotors, one upon another, or put all the vanes united to one or several discs or to a cylinder.

FIG. 2 is the cross section of the vanes in FIG. 1. When the vane faces the fluid, 16, the flow 16 pushes on the vane 14. But when the fluid runs towards the back side of the same vane, as shown by arrows 22, the vane 14 cuts the fluid 22 like a big knife.

FIG. 3 shows the case of the same principle of the fixed vanes, but now the vanes are formed by bent metal sheets. The fluid pressure 16 on the concave surface (the non-aerodynamic surface) 24 pushes on the vane. By its rear sides 30 & 32, the edge 20 will cut the fluid, which slides along the two aerodynamic surfaces, practically without any resistance. The vane's axle-support is in this case a central metal plate 28, and the two sides can be made by other bent plates 24, 30 & 32, which are connected to the central metal plate 28 at 20 and 34.

FIG. 4 shows another version of the same type of metal vane with a central tube 36 of support, and bent plates (24a, 30a & 32a) around, to produce the desired profile.

FIG. 5 represents the ensemble of the pair of vanes with a central tube as support, 36, and a cross section that corresponds to FIG. 4. When the fluid flows in the direction 16, it pushes on the concave surface, i.e. the non-aerodynamic surface 38 of the right vane of the figure, while on the left side fluid flow 22 slides by the sides 30a & 32a of the back part of the vane, cutting the fluid by its edge with very little resistance.

FIG. 6. Shows the case of a metal disc 40 with a set of vanes 42 fixed to its edge, all of them in gravitational equilibrium with respect to the axle of rotation 44. The cross section of the vanes, AB, must be similar to any of the types of vanes already described.

Figure 7:
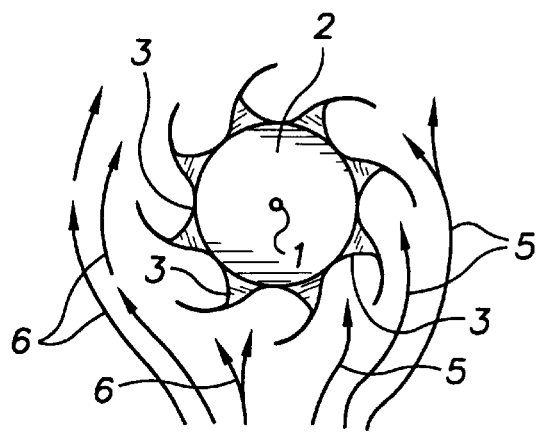
FIG. 7 is an end view of a cylinder having vanes attached thereto in accordance with this invention.

FIG. 7. The vanes can also be installed around a cylinder 46, also fixed to a central axle of rotation 44a this arrangement is indeed very important in places where the wind or the water current are not very strong. The fluid must be deviated and run around both sides of the cylinder 46, increasing its velocity, and therefore its force. This arrangement of the vanes, would be similar to the one shown in this FIG. 7. That is, the vanes will offer their concavities against the fluid pressure, 22. While on the opposite side the fluid 16 would slide by the backs of them, without offering any significant resistance. Again the imbalance of forces makes to turn the cylinder around. Perhaps this type of mill is the only embodiment to be used with its axle in a horizontal position, particularly in water installations. As a mater of fact, if we fix the cylinder by the ends of its axle by means of bearings, the cylinder would at the same time float and turn around, in a similar way as that of the mechanism described in FIG. 8.

Figure 8:
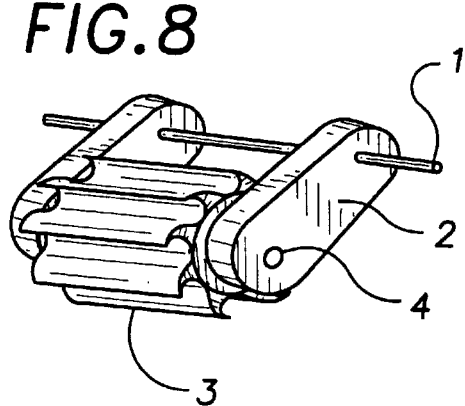
FIG. 8 is a perspective view of a cylinder having vanes attached thereto in accordance with this invention.

In FIG. 8 the rotor 48 is fixed by its axle 50 to two closed supports 52 which include the necessary transmission wheel inside. The ensemble is then supported by an axle 54 to be fixed to floats or to ships of two keels, as described in FIG. 12. Keeping the axle 54 in fixed position into the water current, the cylinder will at the same time float and turn on its axle 50, transmitting its mechanical energy by any suitable existing method.

IV. Parallel Fluid Flow Wind or Water Mills with Turning Vanes

Another practical method to produce a good imbalance of pressures at both sides of the rotor, is by making flat vanes able to turn themselves between the limits of 90 degrees on their own axle-supports, with respect to the central mass of the rotor into which the supports are embedded. So that when by one side of the pair a vane turns to adopt the stand up position, the opposite vane of the pair turns also to adopt the laying down position, cutting in this case the fluid as the edge of a sword or a big knife. Besides, in order to make each vane more sensitive to the rotation, this invention provides the additional condition that the flat turning vanes can also be formed of two different surfaces as parts of the same plane, divided by the axle-support, so that the fluid can exert more pressure against the larger surface, forcing the vane to turn quickly to the desired position. However, both surfaces being, of weights in gravitational equilibrium with respect to the axle, the force of gravity would not play any role in their rotation. This solution offers the opportunity to utilize of vanes of great sensibility for a rapid rotation, without noises or vibrations.

Let us now enter into the description of the figures of these turning vanes.

Figure 9:
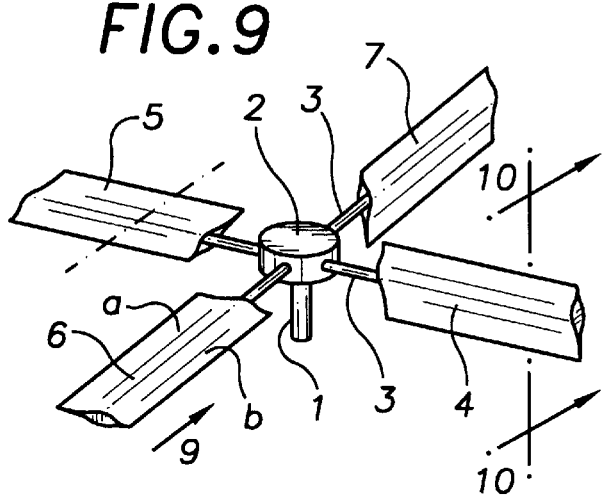
FIG. 9 is a perspective view of another embodiment of the mill of this invention.

FIG. 9. In connection with the mill of turning vanes, this figure shows the ensemble of a rotor of four vanes, able to turn to the limit of 90 degrees on its own axle-supports 56, by means of a simple mechanism which allows the pressure of the fluid to put a vane 58 in stand up position, while the opposite vane of the pair 60 takes lay down position. This solution causes the greater imbalance of the pressures at both sides of axle 10, an imbalance which represents the potential energy of the pair. Of course, there could be any number of pairs, setting them around either a central mass, a cylinder, or a disc, and also with multiple numbers of masses, cylinders or discs set into one or more layers, according to the requirements of the installation.

Figure 10:
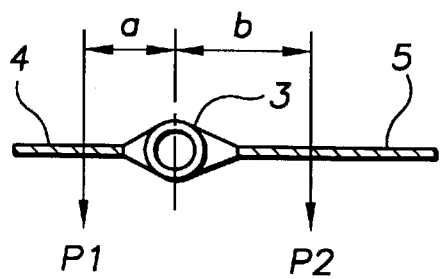
FIG. 10 is a cross sectional view of a vane of FIG. 9.

FIG. 10 shows the case of the vanes able to rotate on their own axle-support, formed by a surface divided by the axle-support 56, into two surface sections of different dimensions, 62 and 64, with weights P1 and P2 in gravitational equilibrium with respect to the tube-support 56. That is $P1(x)a=P2(x)b$. Although in FIG. 9 the vanes are of rectangular shape, they can have any other shape, e.g., they can be a trapezoid, a circumference, etc.

Figure 11:
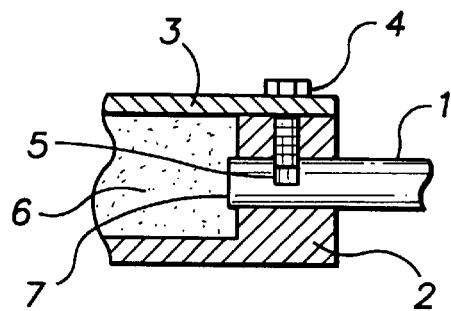
FIG. 11 is a cutaway view of a grease pit which may be used with the mill of FIG. 9.

FIG. 11 represents a cross section of a sector of the cylindrical central mass 66 of FIG. 9, limited to the place where one of the vane's axle-supports is embedded into the mass. The end 68 of the axle of rotation of the vane 56 is embedded into the wall of the mass 66, which has a cylindrical grease pit 70 in the middle; 72 is the cover of the box of the central mass and grease pit, which can be fixed by screws (not shown in the FIG. 11); 74 is a bolt, the end of which is lodged into a groove 76 of the rod of the axle, the purpose of which is to fix the axle, and limit its rotation to 90 degrees.

Figure 12:
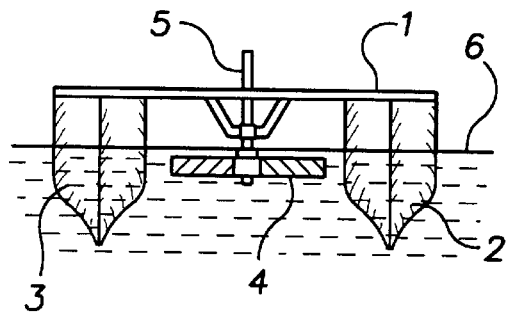
FIG. 12 is an elevational view of a ship having a mill of the current invention attached thereto.

FIG. 12 shows a fluid flow water mill 84 supported by a floating body. In this example of a floating body, a platform is supported by two keels, 80 & 82. The water mill 84 is attached to the platform and extends down into the water current 16. The axle 86 of the mill is rotated by the current acting on the mill to provide useful energy.

Figure 13:
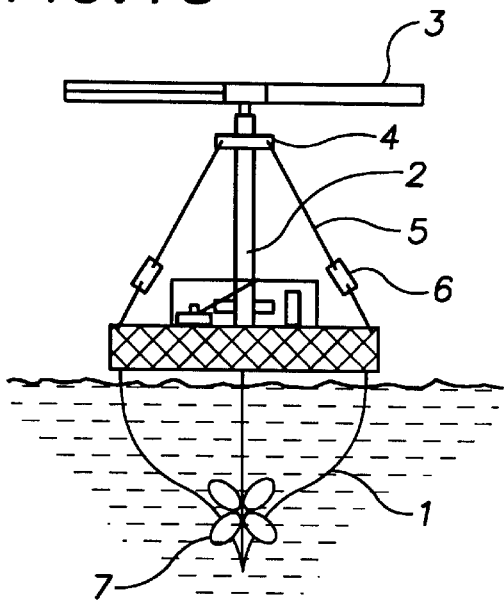
FIG. 13 is a rear elevational view of a ship having a mill of the current invention attached thereto.

FIG. 13 shows a fluid flow wind mill 88 secured to a ship 90 to provide energy to drive the ship's propeller 92. One suitable way to secure the wind mill 88 to the ship is to mount the mill 88 on top of a mast 94 which may be steadied by guide wires such as wire 96.

Figure 14:
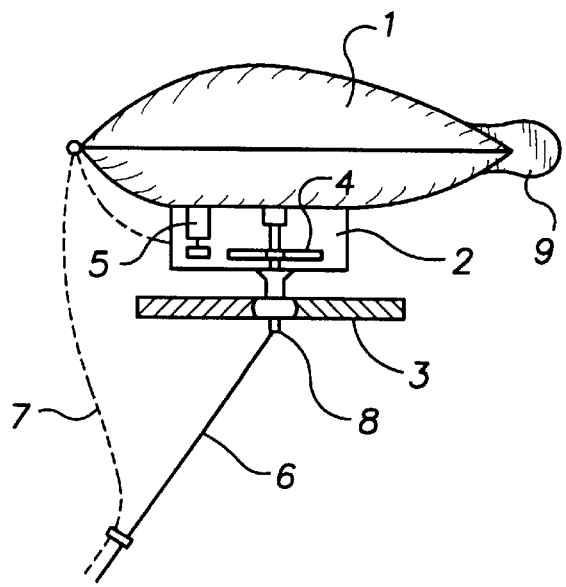
FIG. 14 is an elevational view of a blimp having a mill of the current invention attached thereto.

FIG. 14 shows a fluid flow wind mill 98 secured to an air ship, in this case a blimp 100 (some other possible airships include: globes, zeppelins, balloons and the like). Preferably the airship has a tail 102 and is secured to the earth's surface by an anchor line 104. An electric line 106 is connected to the earth and a generator 108. The blimp 100 may be raised or lowered through the anchor line 104 for maintenance and engaging of the mill.

By way of additional description, and not of limitation, the following numbered paragraphs are included:

1) Parallel fluid flow wind and water mills with one or more stacked horizontal rotors of any number of vanes, fixed to a central mass united to a vertical axle of rotation, these vanes being set up in pairs of the same design and weights, in order to be in horizontal gravitational equilibrium with respect to the axle of rotation, those vanes showing in cross section a flat or concave face on one side, and by its back side, the profile of the edge of an axe with two aerodynamic surfaces, arranged in such a way that when we see in front of us the flat or concave face of any vane, the opposite vane of the pair will show its edge, so that the slightest horizontal impulse of the air or water on the pair will make it turn, always in the same direction, regardless of its weight and dimensions, since the fluid pushes on the vanes at the flat or concave surface, but slides around the aerodynamic sides of the opposite vanes with very little resistance, being the imbalance of forces the useful energy of the pair.

2) Parallel fluid flow wind and water mills, according to paragraph 1, based also on the principle that the imbalance of forces in a horizontal rotor of vanes, designed in pairs, is likewise attained by making the vanes able to turn on their own axle-support to the limit of 90 degrees into the mass of the rotor, in such a way that no matter in which direction the fluid flows, some vanes rotate around themselves to adopt the stand up position perpendicular to the direction of the fluid flow, while at the opposite side, they will take the laying down position, therefore receiving the fluid current against the edge which cut it like a blade of a big knife, causing the rotor imbalance of forces required to make the mill turn to produce energy.

3) Parallel fluid flow wind and water mills according to paragraph 2, which have a central mass that is also a grease pit, to allow the rotation of the vane's axles-support, vanes that can either be constituted by a simple flat surface of any shape and size, integrated to the axle of the vanes described in Paragraph 2, or by two unequal surfaces at both sides of the vane axles, but with the same weights and equal mechanical moments relative to the vane axle, so that the fluid force will be stronger on the greater surface than on the small one, which causes more sensitivity in the vanes to turn and adopt their working position, without the negative intervention of gravity.

4) Parallel fluid flow wind or water mills, according to paragraphs 1 to 3, with the additional condition, in the case of a water mill, that since the rotor can also be horizontally merged into the water stream (rivers, tides, sub-aquatic currents, and sea waves) it must be supported by different means according to the importance and size of the mill, e.g. as by a system of floats which support a deck containing the power apparatus, or by an ordinary ship to carry these mechanisms, or a two keeled ship to carry the rotor between the keels, all these floating bodies being supported in their working positions by means of tow lines, chains, anchors, or cranes placed on shore, or by columns anchored in the bottom of the rivers or seas, installations that can have any suitable disposition for the purposes of this invention.

5) Parallel fluid flow wind or water mills according to paragraphs 1 to 4, that in place of a simple vertical axle of rotation can be used a cylinder of any diameter with a central axle of rotation, the purpose of which is to offer an obstacle to the course of the fluid, forcing it to move around the cylinder with more velocity, thus increasing the production of energy; for this, the vanes around the cylinder being designed in such a manner that on one side of the rotor will always appear the concavities of the vanes, open towards the current, while on the opposite side of the cylinder the fluid slides over the curved backs of the vanes, causing the required imbalance of forces at the two sides of the rotor to produce energy.

6) Parallel fluid flow wind or water mills, according to paragraph 5, that in addition the cylinder with vanes, can also be used in the case of water mills, either with the axle of rotation in vertical position, or in a horizontal position; in the first case the flow of the running water can be conducted by a deviation of the stream, directing it against the concavities of the vanes with the help of dams, channels or tubes; in the second case, the cylinder would behave as a floating rotor when it is set on the water current supported by bearings at the ends of its axle, rotation that can be transformed into mechanical or electrical energy.

7) Parallel fluid flow wind or water mills, according to paragraphs 1 to 5, which, in the case of a wind mill, can also be used as a true turning sail placed at the top of a ship by means of any mechanical installation, or making use of a tower, the turning sail being capable of moving a vessel directly through the helix or propeller, or help it to cross the seas accumulating energy to be utilized for different uses.

8) Parallel fluid flow wind or water mills, according to paragraphs 1 to 4, which can, in the case of a wind mill, be installed on an airship such as a globe, a zeppelin, a blimp, or the like, fixed to a towline anchored on earth's surface (e.g. the land or the sea) and able to rise or lower the airship as desired.

I claim:

1. Parallel Fluid Flow Rotors for Wind and Water Mills with fixed vanes in any number, in one or more stages, set pairs of equal design, dimensions and weights, in order to be in gravitational equilibrium with respect to its central axis, these vanes being in the shape of a transversal section of aerodynamic design, with a concave or flat surface on one lateral side and in the form of a fish head or of the edge of a big axe on the other lateral side, the faces of each pair of vanes being placed in inverted and opposite positions to each other, so that no matter in which direction the fluid, wind or water flows the vane is pushed on by the concave or flat surface of the vane, sliding over the sides of the aerodynamic part of the opposite vane, the difference in impulse made upon each of the pair with respect to the central axis of rotation being what makes the axle rotate, rotating always in the same direction, not withstanding the direction of flow of the fluid.

* * * * *